Feb. 7, 1956  W. DICKISON ET AL  2,733,959
SPRAYING DEVICE
Filed Jan. 3, 1951
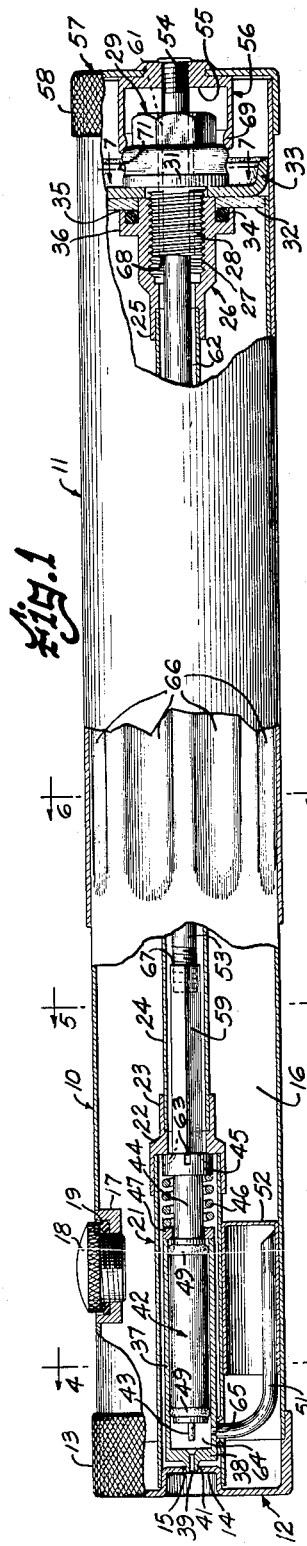
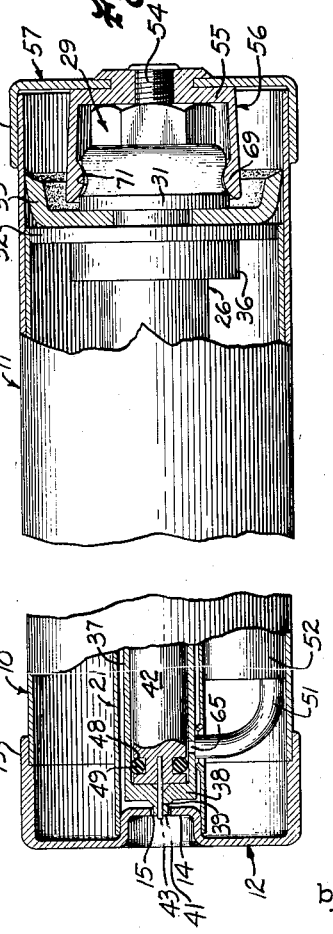
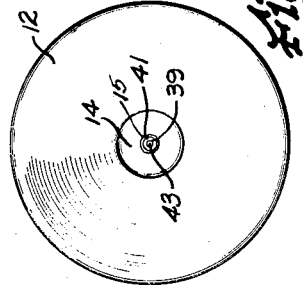
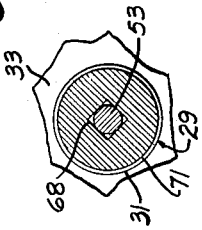
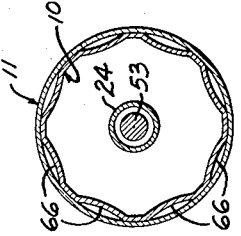
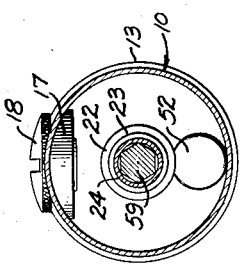
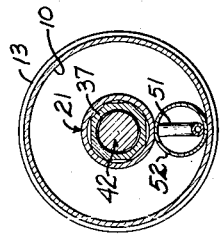
INVENTORS.
WILLIAM DICKISON
JOHN LEWIS WINKS
VICTOR S. TIDD
by Wilson & Geppert
ATT'YS.

United States Patent Office 2,733,959
Patented Feb. 7, 1956

2,733,959
SPRAYING DEVICE

William Dickison, Des Plaines, Ill., and John Lewis Winks and Victor S. Tidd, Lowell, Mich., assignors, by mesne assignments, to Root-Lowell Manufacturing Co., a corporation of Ohio Application January 3, 1951, Serial No. 204,252

13 Claims. (Cl. 299—88)

The present invention relates to sprayers and more particularly to a novel construction and assembly of a hand-operated atomizing sprayer.

Among the objects of the present invention is the provision of a novel hand-operated atomizing sprayer constructed of a pair of telescoping tubular members of relatively small and rigid construction whereby it may be carried about upon the person with little bulk or inconvenience and made readily available for use.

A further object of the present invention is the provision of a novel portable hand sprayer comprising a pair of concentric, slidable members for effectively spraying a concentrated insecticide or other liquid spray in the form of a fine mist.

The present invention further comprehends the provision of a novel spraying device comprising a pair of telescoping sleeve-like members formed of suitable material such as stainless steel, the inner of which forms the insecticide chamber and the outer of which forms the pump barrel, and when these members are pulled apart the insecticide to be dispensed flows to the siphon tube carried by the insecticide chamber and air enters and fills the pump barrel, and on the opposite or forward stroke of the sprayer the air in the barrel is compressed and caused to travel to the front of the insecticide chamber where it is emitted from a circular opening surrounding the discharge end of the siphon tube. The issuing stream of liquid is atomized by the surrounding stream of air to produce an atomized mixture which is delivered in the form of a fine mist.

Another object is to provide within the spraying device an insecticide or other liquid containing chamber which will be in communication with the insecticide storage chamber in such manner that the insecticide chamber will be replenished from the storage chamber by merely tilting the device so that the liquid will flow by gravity from one chamber to the other and thereby be made accessible for discharge in any selected direction by imparting telescopic movement to the main members of the device.

Another and important object of the present invention is the provision of a novel means for and manner of controlling the flow of insecticide in a hand-operated sprayer and of sealing against leakage or dripping when the parts are in inoperative or closed position. In the novel embodiment the spray solution from the siphon is effectively and positively sealed off when the device is not in use so that it may be carried about in any position without danger of leakage.

A further object of the present invention is the provision of a novel locking means for retaining the concentric and tubular telescoping pump members in their retracted, inoperative position when not in use, and when in such inoperative and locked position passage through the spray aperture is effectively prevented.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation of the novel spraying device with portions of the tubular casings broken away to more clearly disclose the inner mechanism and showing the arrangement of the parts at the opposite ends of the housing just prior to the end of the spraying stroke and with the parts in spraying position.

Fig. 2 is a fragmentary enlarged view, part in side elevation and part in vertical cross section, showing the position of the parts at the opposite ends of the device when the sprayer is locked in inoperative or closed position.

Fig. 3 is a view in front elevation of the spraying device.

Figs. 4, 5, 6 and 7 are views in vertical or transverse cross section through the device, the sections being taken in planes represented by the lines 4—4, 5—5, 6—6 and 7—7 of Fig. 1 and viewed in the direction of the arrows.

Referring more particularly to the disclosure in the drawings, the novel spraying device comprises a pair of telescoping or concentric sleeve-like members 10 and 11, with the inner member provided with an end cap 12 having its external, cylindrical surface 13 knurled to provide a hand gripping portion, and its end face provided with a cup-shaped indentation or depression 14 having a relatively small opening 15 disposed centrally thereof. The tubular member 10 is hollow to provide an internal insecticide chamber 16, the circumferential wall thereof being provided with an internally threaded insert 17 having a filling opening and a closure or a filler plug 18 therefor. A resilient gasket 19 provides means for effectively sealing this opening when the closure or plug 18 is tightened, the opening being of sufficient area to permit the insecticide chamber to be readily filled when the occasion requires.

Within the insecticide chamber 16 is centrally disposed a sleeve member 21 encompassing and securely sealed at its forward end upon the cup-shaped portion or indentation 14 of the spray head and at its inner end suitably mounted upon this sleeve member 21 is an enlarged end of a connector or coupling 22, the reduced part 23 thereof being adapted to receive and encompass the forward end of an elongated air tube 24. The rear end of this air tube is conformably received in the bore of a reduced end 25 of a collar or coupling 26 internally threaded at 27 for receiving the threaded shank 28 of a hollow locking bolt 29. This locking screw or bolt is adapted to clamp between its enlarged head 31 and a rigid washer 32, a plunger or piston 33 of leather or other flexible material having a wiping contact with the interior of the outer tubular member 11, and with this washer 32 in sealing contact with gasket 34 mounted within an annular recess 35 in an enlargement 36 on the collar or coupling 26. Thus the sleeve 21, the connector coupling 22, the air tube 24, the collar 26 and the plunger 33 are carried by and move with the inner tubular member or insecticide chamber 16 as the tubular members 10 and 11 are pulled apart or pushed together in the operation of the sprayer, the washer 32 providing an end wall for the inner end of the tubular member 10.

Also mounted within the sleeve 21 is an inner tubular part 37 of polygonal outer contour (see Fig. 4) having a forward end wall 38 provided with a centrally arranged bore or opening 39 in alignment with the opening 15 in the recess or depression 14. This opening is countersunk or enlarged at its inner end and the material defining the opening at its outer end is extended to provide an annular projection 41 extending into the opening 15 and providing a siphon tube. The opening or bore 39 provides an aperture for passage of the insecticide and disposed within the tubular part 37 is a plunger 42 having at its forward end a pin or projection 43 the outer end of which is adapted to be received in the aperture or opening 39 of the siphon tube 41 and to loosely fit therein so as to prevent the entrance of foreign matter into the apparatus when the sprayer is not in use and its tubular members 10 and 11 are held in retracted position. The pin 43 also serves as a cleaner to expel any crystals or other matter which might collect as the result of evaporation or otherwise in the tube. This plunger 42 is provided at its rearward end with a reduced portion or shank 44 having an enlargement or head 45 which is spring-biased toward the right as viewed in Fig. 1 by a coil spring 46 seating at one end against the head 45 and at its other end against a collar 47 encompassing the shank and abutting the inner end of the tubular part 37.

By this construction and arrangement of parts, the plunger 42 is normally retained in retracted or open and spraying position in which the head or enlargement 45 is forced rearwardly against the adjacent shoulder on the interior of the coupling or connector 22 and the pin or projection 43 is retained in its retracted position (see Fig. 1). The plunger 42 adjacent each end is provided with an annular and radially outwardly opening groove or recess 48 in each of which is mounted a resilient O-ring 49 having a wiping and sealing contact with the interior of the cylindrical wall of the tubular part 37, thus completely sealing the insecticide chamber from leakage.

A supply tube 51 is attached to and arranged in a cup or receptacle 52 communicating at its open end with the chamber 16 in such manner that whenever the spraying device is held in a substantially horizontal position, the cup or receptacle fills with liquid insecticide from the supply chamber or reservoir 16. Thus when the sprayer is held in a vertical position it is adapted to project a spray upwardly until the cup or receptacle is empty. By tilting the sprayer to a substantially horizontal position or beyond, the cup or receptacle is again filled from chamber 16. When the sprayer is directed downward, so long as there is sufficient insecticide in the chamber or reservoir 16 to submerge the forward end of the cup or receptacle 52, this cup or receptacle remains full due to the siphoning action of the sprayer.

Mounted within the outer tubular member 11 is an elongated rod 53 which may be threaded, upset or otherwise anchored at its rear end 54 in the base 55 of a spring clip 56 and in an end cap 57 having a knurled outer surface at 58. This rod projects through the hollow bolt 29 and its hollow shank 28, through the coupling or connector 26 and for a substantial length into the elongated air tube 24. Within the forward end of this air tube 24, there is provided a section 59 preferably of hexagonal shape attached to the forward end of the rod 53 (Figs. 1 and 5).

The longitudinal opening 61 in the hollow bolt 29 opens into the annular opening or spacing 62 between the rod 53 and the encompassing air tube 24, and into the longitudinal spaces provided between the sides or exterior of the hexagonal section 59 and the adjacent inner circumference of the air tube. Air then passes through the slots 63 in the rear face of the head 45, then through the longitudinal spaces between the polygonal outer contour of the tubular part 37 and the interior of the cylindrical sleeve 21. The air passing the plunger assembly is emitted around the outside of the siphon tube 41 where it mixes with the liquid insecticide withdrawn through the supply tube 51, an opening or aperture 65 and the space 64.

To provide for the entrance of air into the outer tube 11 and rearwardly of the plunger 33, air is drawn inwardly between the telescoping surfaces of the tubular members 10 and 11, the inner of which is provided with longitudinally arranged flutes 66 extending preferably from approximately the position shown in Fig. 1, to the inner end of the tube 10 where it carries the plunger. When the tubular members 10 and 11 are pulled firmly apart, air enters and passes along the flutes 66 into the chamber of the tubular member 11 to the rear of the plunger 33. This outer stroke, i. e. pulling the tubular members apart from the position shown in Fig. 1, is limited by the end 67 of the hexagonal section 59 which forms a stop when engaging the forward end 68 of the hollow bolt 29.

On the forward stroke, i. e. when the tubular members 10 and 11 are pushed together, the air in the chamber of the outer member 11 is compressed and forced through the hollow nut 29, the air tube 24 and about the member 37 to be discharged about the siphon tube 41, where it mixes with the insecticide from the siphon tube 41 and the atomized mixture is ejected as a fine mist.

When the spraying operation has been completed, the tubular members are moved together to the closed position of Fig. 2 in which the pin or projection 43 is forced into the siphon tube 41, cleaning and dislodging any solid particles from this tube and preventing the entrance of foreign matter into the tube. To prevent or insure against any leakage or dripping of the insecticide through siphon tube and about the pin when in closed position, the front O-ring 49 adjacent the forward end of the plunger 42 having been moved forwardly, is then disposed between the aperture 65 opening into the supply tube 51 and the siphon tube 41. At the same time, the insecticide is prevented from escaping from about the rear of the plunger 42 by the back O-ring 49. To retain the tubular members locked in this closed or inoperative position and held against accidental dislodgment, the spring fingers 69 of the clip 56 engage or seat in an annular recess or groove 71 on the head of the bolt 29. These springs may be readily released by firmly grasping the ends of the sprayer and forcibly pulling the tubular members 10 and 11 apart.

The physical character of the spray issuing from the siphon tube 41 may be modified by manipulating the filler cap 18. For example, by loosening this cap, a denser spray will be emitted. If desired, particles of dirt or other foreign matter may be quickly and conveniently dislodged by removing the filler plug 18 and then by placing the thumb over the recess in the siphon tube 41, air can be forced back through the assembly and through the filler plug opening by operating the pump barrel as in the spraying operation.

It will be apparent from the above disclosure that the present invention comprehends a hand-operated sprayer of strong construction with the tubular members formed of non-corrosive metal or other suitable material. The sprayer being of relatively small size, for example, approximately nine to ten inches in length, it may be readily carried about and easily stored when not in use, and when not in use and moved to closed or inoperative position, any leakage is effectively prevented and the operator is assured that when he is ready to use the sprayer the siphon tube is open and clear of any foreign particles.

The present novel spraying device is particularly well adapted for use with concentrated spray solutions or insecticides and in operation emits a fine mist that has proven highly effective.

Having thus disclosed the invention, we claim:

1. A hand-operated insecticide sprayer comprising a pair of telescoping tubular members one of which forms an insecticide chamber containing a spray solution to be dispensed and the other a pump chamber for supplying air under pressure, means for supplying air to the pump chamber by drawing air from the exterior and between the telescoping members when said members are pulled apart, an air tube extending longitudinally of the insecticide chamber and opening into the pump chamber, means for compressing the air in the pump chamber and supplying the air under pressure forwardly through the air tube, a hollow member mounted in the insecticide chamber and communicating with the air tube, a siphon tube at the forward end of the hollow member and discharging the spray solution through the forward end of the insecticide chamber, means for supplying the spray solution to said hollow member for discharge through the siphon tube, means connecting with the air tube for discharging the compressed air from the air tube about the siphon tube, and means for sealing off the flow through the siphon tube when the sprayer is not in use.

2. A compact, hand-operated sprayer comprising a pair of telescoping tubular parts of rigid, non-corrosive metal adapted to be pulled apart and pushed together to cause a pumping action for the discharge of a liquid spray in the form of a fine mist, one of said parts providing a reservoir for the liquid spray and the other an air chamber, one or more longitudinal flutes in the telescoping tubular surface of one of said parts for the passage of air into the air chamber, an air tube carried by the tubular part forming the liquid reservoir, a plunger on the air tube and movable therewith, a rod carried by the other tubular part and extending through the air tube but in spaced relation therewith to allow for the passage therebetween of air under pressure, means for directing the air under pressure through an orifice at the forward end of the tubular part forming the reservoir, and a siphon tube connected to the liquid spray in the reservoir and discharging it at the forward end of the sprayer where it mixes with the discharged air under pressure to project the liquid spray in the form of a fine mist.

3. A compact, hand-operated sprayer comprising a pair of telescoping tubular parts of rigid construction adapted to be grasped at the ends and pulled apart and pushed together to cause a pumping action for the discharge of a spray solution in the form of a fine mist, one of said tubular parts being adapted to receive and provide a supply chamber for a spray solution and the other providing a pump chamber for supplying air under pressure, said tubular part forming the supply chamber having an end wall provided with an opening, a siphon tube for the discharge of the spray solution, a receptacle in the supply chamber for receiving spray solution from said chamber, a tube for supplying spray solution from said receptacle to said siphon tube, said siphon tube being smaller than the opening to provide an encompassing discharge passage for the discharge therethrough of air under pressure, and an air tube assembly extending longitudinally through the supply chamber and at one end encompassing the siphon tube and at its other end provided with a plunger for compressing the air in the pump chamber and directing the air under pressure forwardly through the tube assembly and outwardly through the discharge orifice.

4. A compact, hand-operated sprayer comprising a pair of telescoping members of rigid construction closed at their opposite ends except for a discharge orifice for air and a discharge passage for spray solution in one of said members, one of said members providing a reservoir for the spray solution and the other providing a pump chamber, a plunger carried by said reservoir member for compressing air drawn into the pump chamber as the telescoping members are grasped at their ends and pushed together, an air tube assembly for supplying the compressed air to the discharge orifice at the forward end of the sprayer, a siphon tube in the forward end of the air tube assembly provided with the discharge passage for the spray solution, the discharge end of said siphon tube projecting into the discharge orifice for the air and of less diameter than that of said orifice to provide an annular discharge passage for the escaping air about the siphon tube, and a supply tube for supplying the spray solution to the siphon tube and discharge orifice.

5. A compact, hand-operated sprayer comprising a pair of telescoping members one of which forms a reservoir for a spray solution and has a spray opening at one end and the other providing an air chamber, said members being adapted to be operated by grasping the ends thereof and pulling these members apart for the intake of air and pushing these members together for compressing the air collected in the air chamber, a plunger for compressing the air in the air chamber, a siphon tube, a cup in said reservoir for receiving spray solution from the reservoir whenever the sprayer is moved toward horizontal position, means for supplying said siphon tube with spray solution from the cup, said siphon tube being supplied with spray solution from the cup and having a discharge orifice opening into the atmosphere at the spray opening, and an air tube encompassing the siphon tube adjacent the spray opening and provided with a restricted annular passage encompassing the orifice of the siphon tube for conveying air under pressure from the air chamber to the discharge opening and about the end of the siphon tube, said cup being so positioned as to supply spray solution to the siphon tube and permit the sprayer to operate in any position in which it is held, including when directed upwardly or downwardly.

6. In a hand-operated sprayer, a pair of telescoping tubular members the inner of which is provided with a recessed end cap at its forward end having a discharge aperture and the outer of which is provided with a closure at its rear end, the inner member providing a chamber for a spray solution and the outer member providing an air chamber, an air tube assembly extending through the inner member and carrying a plunger at its rear end for compressing air entering the outer member, said air tube assembly having a restricted passage opening into the air chamber for conveying the air under pressure from the air chamber to the discharge aperture at the forward end of the inner member, a siphon tube in said air tube assembly adjacent its discharge end and having a discharge orifice projecting into the recessed end cap and centrally of its discharge aperture for the air whereby to provide an annular air passage about the discharge orifice of the siphon tube, and means for supplying spray solution to the siphon tube, said tubular members on the forward stroke compressing the air in the air chamber and causing the air under pressure to pass through the air tube assembly and through the air discharge aperture about the orifice in the siphon tube whereby spray solution flowing to and emitted from the siphon tube is mixed with the discharged air and projected as a fine mist.

7. In a compact, hand-operated sprayer, a pair of concentric tubular members longitudinally movable in telescoping relation and one having a discharge opening at one end, one of said members providing a reservoir for a liquid insecticide or spray solution and the other providing an air chamber for receiving air as the members are pulled apart, a plunger for compressing the air in the air chamber as the members are pushed together, an air tube for conveying the compressed air to the discharge opening at the front of the sprayer, a cup open to said reservoir for receiving a quantity of liquid from the reservoir whenever the sprayer is tilted so that liquid flows from the reservoir into the cup, and a siphon tube within said air tube having an end projecting centrally into the opening and thereat provided with a discharge orifice for liquid supplied thereto from the cup, the projecting end of said siphon tube being of less diameter than the discharge opening to provide an annular passage about said projecting end whereby the air supplied to the discharge opening is exhausted about the orifice in the siphon tube.

8. A compact, hand-operated sprayer, comprising a pair of telescoping members of rigid construction closed at their opposite ends except for a discharge orifice for a liquid insecticide and a passage for discharging air about and encompassing the liquid discharge orifice provided in one of said members, said last mentioned member providing a supply chamber for the liquid insecticide and the other providing a pump chamber, means in said sprayer for compressing air drawn into the pump chamber as the telescoping members are grasped at their ends and pushed together, a liquid receptacle and a supply tube in said supply chamber for supplying liquid insecticide to the discharge orifice, means for conveying the air under pressure from the pump chamber to the discharge passage about the orifice, and means for closing and sealing the discharge orifice against leakage of the insecticide when the telescoping members are moved to closed and inoperative position.

9. A compact, hand-operated sprayer, comprising a pair of telescoping members of rigid construction closed at their opposite ends except for an orifice for the passage of a liquid insecticide and a discharge passage for air under pressure about and encompassing the orifice provided in an end of one of said members, said last mentioned member providing a liquid insecticide chamber and the other member providing a pump chamber, a liquid receptacle opening into said liquid insecticide chamber for supplying liquid insecticide from the the insecticide chamber to the orifice, means for supplying air under pressure to the discharge passage, and a plunger actuated when the members are moved to their inoperative or storage position and provided with a projecting end adapted to be received in the orifice for sealing off the flow of liquid insecticide from the insecticide chamber to the orifice.

10. A compact, hand-operated sprayer, comprising a pair of telescoping members of rigid construction having at one end a discharge orifice for the passage of a liquid insecticide and a discharge opening for air under pressure about the orifice, a liquid insecticide chamber provided in one member and a pump chamber provided in the other, means for supplying liquid insecticide from the insecticide chamber to the orifice, means for supplying air under pressure to the discharge opening and about the liquid orifice, a plunger actuated when the members are moved to their inoperative or storage position for sealing off the flow of liquid insecticide from the insecticide chamber to the orifice, and a projection on the plunger entering the orifice for cleaning this orifice and maintaining it unobstructed and ready for immediate use.

11. A compact, hand-operated sprayer in which the flow of spray solution is prevented when not in use, comprising a pair of telescoping members having a siphon tube provided with a discharge orifice at one end for the passage of a spray solution and a discharge passage for air under pressure about the orifice, one of said members having a reservoir for a spray solution and the other member having a pump chamber, means for supplying a spray solution from the reservoir to the discharge orifice of the siphon tube, means for supplying air under pressure to the discharge passage about the orifice, a plunger actuated when the members are moved to their inoperative or storage position for sealing off the passage of the spray solution from the reservoir, a projection on the plunger entering the orifice of the siphon tube for cleaning this orifice and maintaining it unobstructed and ready for immediate use, and locking means for retaining the telescoping members in closed, inoperative position.

12. A hand-operated sprayer comprising a pair of telescoping members provided at their outer ends with end walls, the end wall of one of said members being recessed and having an opening therethrough, a siphon tube projecting into said opening and provided with a liquid discharge orifice, said siphon tube being smaller than the opening to provide an encompassing discharge passage for the discharge therethrough of air under pressure about the orifice of the siphon tube, a cylindrical liquid-containing chamber disposed within and carried by one of said members, said chamber being open at one end for communication with the interior of said member, and means operable by telescopic action of said members for producing a suction on said tube to thereby discharge liquid from the chamber through said recessed end wall.

13. A hand-operated sprayer comprising a pair of telescoping members closed at their opposite ends except for a discharge orifice for air and a discharge passage for spray solution in one end of one of said members, one of said members providing a reservoir for the spray solution and the other providing a pump chamber, means for compressing air drawn into the pump chamber as the telescoping members are grasped at their ends and pushed together and for supplying the compressed air to the discharge orifice, a siphon tube provided with the discharge passage for the spray solution and having its discharge end projecting into the discharge orifice for the air whereby the air is discharged about the siphon tube, a cup open to said reservoir for receiving a quantity of the spray solution from the reservoir whenever the sprayer is tilted sufficient to allow spray solution to flow from the reservoir into the cup, and means for supplying spray solution from the cup to the siphon tube, said cup supplying spray solution to the siphon tube to permit the sprayer to operate in any position in which it is held, including when directed upwardly or downwardly.

References Cited in the file of this patent

UNITED STATES PATENTS

| | | |
|---|---|---|
| 1,020,833 | Manning | Mar. 19, 1912 |
| 1,849,661 | Custer | Mar. 15, 1932 |
| 2,081,674 | Mehrman et al. | May 25, 1937 |
| 2,479,895 | Bahnson | Aug. 23, 1949 |
| 2,591,653 | Altieri et al. | Apr. 1, 1952 |

FOREIGN PATENTS

| | | |
|---|---|---|
| 627,665 | Great Britain | Aug. 12, 1949 |
| 638,508 | France | Feb. 21, 1928 |
| 645,379 | France | June 26, 1928 |